Sept. 27, 1949.  W. J. ECKERT  2,482,749
SEXTANT OR THE LIKE
Filed Jan. 6, 1945
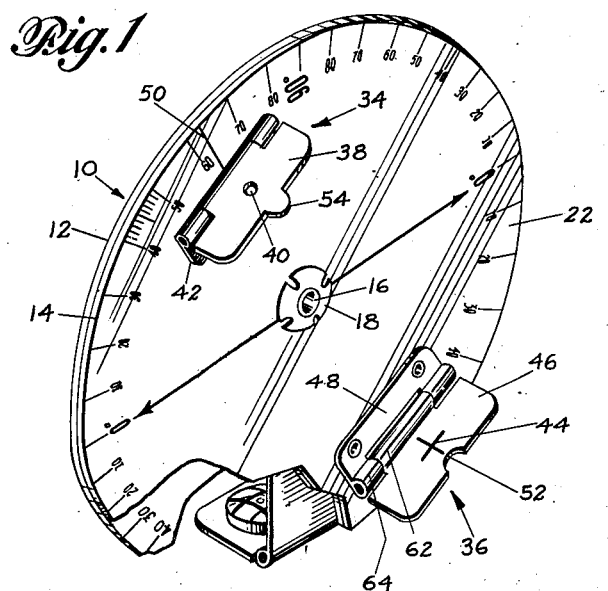
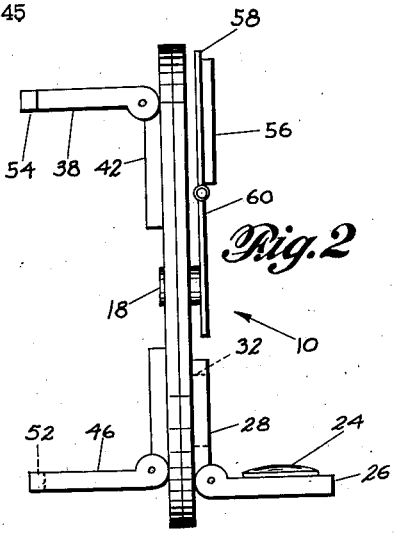
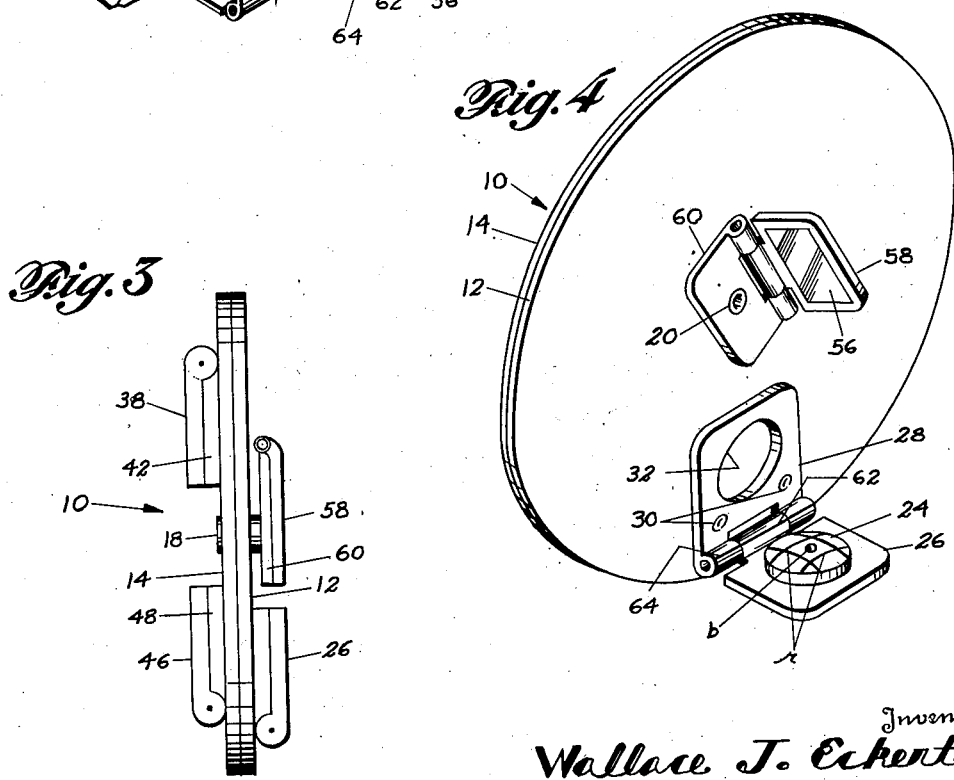
Inventor
Wallace J. Eckert
By S. E. Bush
Attorney Patented Sept. 27, 1949

2,482,749

UNITED STATES PATENT OFFICE 2,482,749

SEXTANT OR THE LIKE

Wallace J. Eckert, Washington, D. C.

Application January 6, 1945, Serial No. 571,641

15 Claims. (Cl. 33—70)

(Granted under the act of March 3, 1883, as amended April 30, 1928; 370 O. G. 757)

This invention relates to a device for determining altitude, and more especially to a sextant.

There is need for an instrument which may be included in life boat and life raft equipment to enable the occupants to determine with a reasonable degree of accuracy, their geographical position, so that they may be guided in their action. Such a device would also be useful to small boat navigators, explorers, and in general, but perhaps to a lesser extent, to sportsmen.

With this in view an object of this invention is to provide a compact, rugged instrument which may be employed to determine altitude at a given geographical position, which may be used in the determination of longitude and latitude; the device being of such simple design and operation that one totally uninformed with the procedure for taking sights may, with a few minutes' practice, determine the altitude of an object in space with respect to the horizon, with sufficient accuracy to calculate his latitude and longitude within an accuracy of a few miles.

As illustrated herein, the invention resides in a combination of cooperating elements including a pair of juxtaposed members rotatable with respect to each other about a common axis, one of the members having inscribed thereon, a scale divided into degrees, and the other of the members having inscribed thereon a reference mark. Associated with the member having the scale thereon, there is means for locating a given division on the scale in a horizontal plane, and with the member having the reference mark, means to facilitate training the reference mark so that it will lie along a line of sight passing through a celestial body, the altitude of which is to be determined, whereby the altitude of the celestial body may be determined by observing the angular distance between the division set in the horizontal plane and the position of the reference mark sighted upon the celestial body. More specifically, the scale inscribed on the one member is divided into four quadrants, each of which is subdivided into degrees from 0° to 90° with the zero degree marks diametrically opposite, and a bubble level is attached to this member to facilitate setting the members in position with the zero degree marks in a horizontal plane as by keeping the bubble centralized with respect to center marks in the bubble level case. With the one member held fixed, the other member is rotated to bring the reference mark thereon onto the celestial body being sighted upon, and to facilitate this, there is attached to this member, a pair of spaced sights lying along the reference mark on the disc, the sights being so situated that the operator may by rotating the disc, train the sights on the celestial body, and hence, train the reference mark on the celestial body. To permit simultaneous observation of the celestial body and bubble, a mirror is mounted on the disc which may be adapted to permit the operator to see the bubble at all times.

The invention will now be described with reference to the accompanying drawing, in which:

Fig. 1 is a perspective view of my novel bubble level sextant;

Fig. 2 is an edge view of the sextant with the sighting means and the bubble level extending in position for use;

Fig. 3 is an edge view of the device folded up; and

Fig. 4 is a perspective view of the reverse side of the sextant.

Referring to Fig. 1, the bubble level sextant 10 comprises a pair of plastic discs or circular members 12 and 14 mounted in juxtaposed relation for rotation about a common axis upon a hollow rivet 16, the rivet being headed over at 18 and 20 to hold the discs in cooperating relation. The disc 12 is opaque and the disc 14 is transparent. There is inscribed on the inner surface of the opaque disc 12, that is, adjacent to the inner surface of the transparent disc 14, a scale 22 marked off in degrees, which is visible through the transparent disc. This scale is divided into quadrants and each quadrant is subdivided into degrees from 0° to 90°, the scales being so arranged that the 0° mark of the scales are diametrically opposite. There is attached to the disc 12, a bubble level 24, Fig. 4, of the usual type, the bubble level being mounted on one leaf 26 of a hinge, the other leaf 28 of which is attached by rivets 30 to the member 12 near the peripheral edge thereof, and on a radius which is perpendicular to the line passing through the 0° marks on the disc 12. To permit folding the leaf 26 into engagement with the leaf 28, there is formed in the leaf a circular aperture 32 adapted to receive the bubble level 24. On the disc 14 there is mounted a sight consisting of a pair of diametrically disposed members 34 and 36, Fig. 1, the member 34 comprising a leaf 38, having an aperture 40 formed therein, which is hinged to a leaf 42, the latter being fastened to the surface of the disc 14. The member 36 comprises a leaf 46 on which there is inscribed a target 44, the leaf 46 being hinged to a leaf 48 which in turn is fastened to the disc 14. In using the device, as thus constructed, the operator holds the discs 12 and 14 on edge in a vertical position with the bubble level 24 at the bottom, and so located that the bubble b is centered concentrically within the reference marks r, and then rotates the disc 14 with respect to the disc 12 so that the sun shines through the orifice 40 and forms a spot of light on the target 44. With the instrument so positioned, the altitude of the sun with respect to the horizon may be determined by noting the angular distance in degrees between the 0° degree mark on the disc 12 and a reference mark 50 inscribed on the disc 14, the reference mark 50 being in line with the center of the aperture 40 and the center of the target 44. As shown in Fig. 1, the angular distance for this particular setting is approximately 63°. In many instances it is not feasible to use the sun for sighting and if it is desirable to sight on a star, for example, there is provided a sighting arrangement consisting of a notch 52 formed in the leaf 46 and a knub 54 formed on the leaf 38 along which the operator may sight by holding the instrument up to his eyes in the manner of sighting a gun. In using the instrument in this fashion, it is desirable to be able to observe the position of the bubble at the same time that the sight on the object is being taken so as to be sure that the horizontal position of the 0° degree mark is maintained. To this end, there is provided a mirror 56 mounted in a recess formed in one leaf 58 of a hinge, the other leaf 60 of which is mounted on the end of the hollow rivet 16 and secured in place by the flanged end portion 20 thereof. As thus mounted, the hinge may be rotated on the rivet 16 so that for whatever position the instrument is held, the mirror may be rotated to give a view of the bubble, and hence, to permit the operator to observe with one eye the object, the altitude of which is to be determined, and with the other eye, the position of the bubble b. In order that the sights and the bubble may be positioned accurately with respect to the disc, that is, normal to their surface and always in the same position, there are provided on the inside of the hinges of each of the component parts of the sights and the bubble level, reference scratches 62 and 64, which when aligned, as shown in Fig. 2, insure a right angle relation between the leaves of the hinges.

In Fig. 2, the instrument is shown with the component parts of the sights in position for use and the bubble level extended for use. As heretofore related, when the sun is being used for obtaining altitude, it is not necessary to use the mirror, and hence, it may be folded upwardly, as shown in Fig. 2, so that it is in an out of the way position. When the instrument is not in use and is to be stored, the component parts of the sight, the bubble level and the mirror may be folded over, as shown in Fig. 3, so that the instrument will fit into a relatively flat receptacle.

To restate the operation of the sextant for obtaining the altitude of a given celestial body in space, the instrument is removed from its case and the component parts of the sight and bubble level are folded outwardly at right angles to the face of the disc so that the reference marks 62 and 64 are in coincidence. The sextant is then placed so that the bubble b is centered with respect to the reference marks r which thus sets the 0° marks in a horizontal plane, representing the horizon. If the sextant is held at about chest height, the operator by looking down at the bubble b may observe the bubble and at the same time observe the target 44. By rotating the disc 14 he may cause a ray of light from the sun to pass directly through the aperture 40 onto the target 44, and when this condition exists, he will know that the reference mark 50 is trained upon the sun. The angular position of the sun with respect to the horizon may then be determined by noting the distance between the 0° mark on the disc 12 and the position of the reference mark 50 with respect to the scale on the disc 12. If there is not sufficient light from the sun to produce a beam of light in the target, that is, when there are no direct rays from the sun or at night when the only available sighting means would be the stars, and it is desirable to ascertain the altitude, the operator holds the instrument about six inches from his eyes and sights across the notch 52 and knub 54 at the particular body, the altitude of which is to be determined, and at the same time, looks into the mirror 56 so that he can see whether the bubble b is centered with respect to the lines r which will indicate that the 0° mark is in a horizontal plane. When these conditions exist, the angular distance between the body upon which he is taking a sight and the horizon will again be the distance between the 0° mark on the scale on the disc 12 and the reference mark 50.

To assure accuracy and to compensate for any error in the manipulation of the sextant in taking readings of the altitude, it is desirable to sight the instrument and take the readings at both ends of the reference mark 50 with the scale first at one side and then to reverse the instrument by rotating it about a vertical axis through 180° and take another set of readings. The four values should then be averaged and the resultant angle will be accurate enough for the purpose for which the unit was designed.

The invention described therein may be manufactured and used by or for the Government of the United States of America for governmental purposes without the payment of any royalties thereon or therefor.

What is claimed is:

1. In combination in a device of the class described, juxtaposed members mounted on a common axis for rotation with respect to each other and having inner surfaces adjacent to each other, one of said rotatable members having a scale thereon, the other of said rotatable members having a reference mark thereon, leveling means mounted on the outer surface of said scale carrying member, and adapted to set a given division on said scale in a horizontal plane and to set said members vertically, and means mounted on the outer surface of said other rotatable member for training said reference mark on an object by rotation of said other rotatable member, said juxtaposed members being of small combined thickness providing for simultaneous observation of said leveling means and said training means mounted on the said opposite outer surfaces of the said members of the device.

2. In combination in a device of the class described, juxtaposed members mounted on a common axis for rotation with respect to each other and having inner surfaces adjacent to each other, one of said rotatable members having a scale thereon, the other of said rotatable members having a reference mark thereon, leveling means mounted on the outer surface of said scale carrying member at a point removed from said common axis and adapted to set a given division on said scale in a horizontal plane and to set said members vertically, means mounted on the outer surface of said other rotatable member for training said reference mark on an object by rotation of said other rotatable member, said juxtaposed members being of small combined thickness providing for simultaneous observation of said leveling means and said training means mounted on the said opposite outer surfaces of the said members of the device.

3. In combination in a device of the class described, juxtaposed members mounted on a common axis for rotation with respect to each other and having inner surfaces adjacent to each other, one of said rotatable members having a scale thereon, the other of said rotatable members having a reference mark thereon, leveling means mounted on the outer surface of said scale carrying member at a point removed from said common axis and adapted to set a given division on said scale in a horizontal plane and to set said members vertically, a mirror rotatably mounted on said common axis at the outer surface of said scale carrying member for observation of said leveling means in said mirror, and means mounted on the outer surface of said other rotatable member for training said reference mark on an object by rotation of said other rotatable member, said juxtaposed members being of small combined thickness providing for simultaneous observation of said leveling means and said training means mounted on the said opposite outer surfaces of the said members of the device.

4. In combination in a device of the class described, a pair of juxtaposed discs of like size and shape mounted on a common axis for rotation with respect to each other and having inner surfaces adjacent to each other, one of said rotatable discs having a scale on its inner surface, the other of said rotatable discs having a reference mark thereon and having a transparent portion overlying said scale, a bubble level mounted on the outer surface of said scale carrying disc and disposed to indicate when a given division on the scale is in a horizontal plane and to indicate when said discs are vertical, and means mounted on the outer surface of said other rotatable disc for training said reference mark on an object by rotation of said other rotatable disc, said training means comprising a pair of spaced apart elements providing a common mounting for visual line of sight means including a projection on one element and a notch on the other and light ray alignment means including a hole in one element and a target on the other element, and a mirror rotatably mounted on said common axis at the outer surface of said scale carrying disc for observation of said bubble level in said mirror when visually sighting said training means, said juxtaposed discs being of small combined thickness and providing for simultaneous observation of said bubble level and the said training means mounted on the said opposite outer surfaces of said discs of the device.

5. In combination in a device of the class described, a pair of juxtaposed discs of like size and shape mounted on a common axis for rotation with respect to each other and having inner surfaces adjacent to each other, one of said rotatable discs having a scale on its inner surface, the other of said rotatable discs having a reference mark thereon and having a transparent portion overlying said scale, a bubble level mounted on the outer surface of said scale carrying disc and disposed to indicate when a given division on the scale is in a horizontal plane and to indicate when said discs are vertical, and means mounted on the outer surface of said other rotatable disc for training said reference mark on an object by rotation of said other rotatable disc, said training means comprising a pair of spaced apart elements providing a common mounting for visual line of sight means including a projection on one element and a notch on the other and light ray alignment means including a hole in one element and a target on the other element, and a mirror rotatably mounted on said common axis at the outer surface of said scale carrying disc for observation of said bubble level in said mirror when visually sighting said training means, said juxtaposed discs being of small combined thickness and providing for simultaneous observation of said bubble level and the said training means mounted on the said opposite outer surfaces of said discs of the device, said bubble level and mirror being independently hingedly mounted on the outer surface of said scale carrying disc and said elements of said training means being independently hingedly mounted on the outer surface of said other rotatable disc, and each being movable from a workable position at right angles to the discs to a collapsed position against the faces of said discs.

6. In combination in a device of the class described, a pair of juxtaposed discs of like size and shape mounted on a common axis for rotation with respect to each other and having inner surfaces adjacent to each other, one of said rotatable discs having a scale on its inner surface, the other of said rotatable discs having a reference mark thereon and having a transparent portion overlying said scale, a bubble level mounted on the outer surface of said scale carrying disc and disposed to indicate when a given division on the scale is in a horizontal plane and to indicate when said discs are vertical, and means mounted on the outer surface of said other rotatable disc for training said reference mark on an object by rotation of said other rotatable disc, said training means comprising a pair of spaced apart elements providing a common mounting for visual line of sight means including a projection on one element and a notch on the other and light ray alignment means including a hole in one element and a target on the other element, and a mirror rotatably mounted on said common axis at the outer surface of said scale carrying disc for observation of said bubble level in said mirror when visually sighting said training means, said juxtaposed discs being of small combined thickness and providing for simultaneous observation of said bubble level and the said training means mounted on the said opposite outer surfaces of said discs of the device, said bubble level and mirror being independently hingedly mounted on the outer surface of said scale carrying disc and said elements of said training means being independently hingedly mounted on the outer surface of said other rotatable disc, and each being movable from a working position at right angles to the discs to a collapsed position against the faces of said discs, and means for indicating when each of said hinged members is normal to the said discs, said means comprising lines inscribed across the hinged portions of the hingedly mounted elements, said lines being so disposed as to form a continuous straight line when the hingedly mounted elements are normal to said discs.

7. In combination in a device of the class described, juxtaposed members mounted on a common axis for rotation with respect to each other and having inner surfaces adjacent to each other, one of said rotatable members having a scale thereon, the other of said rotatable members having a reference mark thereon, leveling means mounted on the outer surface of said scale carrying member, and adapted to set a given division on said scale in a horizontal plane and to set said members vertically, and means mounted on the outer surface of said other rotatable member for training said reference mark on an object by rotation of said other rotatable member, said juxtaposed members being of small combined thickness providing for simultaneous observation of said leveling means and said training means mounted on the said opposite outer surfaces of the said members of the device, said juxtaposed members comprising discs, said scale being circular and disposed on said one of said disc members, said scale being divided into quadrants each subdivided into degree divisions from zero to ninety degrees and providing a pair of diametrically opposite zero degree marks providing said given division line, adapting the device to be used with the scale facing in either direction, and adapting the device to take readings at both ends of the said given division line with the scale first at one side and to reverse the device by rotating it about a vertical axis through 180° to take another set of readings, enabling a plurality of readings to be readily taken and averaged for accuracy.

8. In combination in a device of the class described, a pair of registering coincident juxtaposed discs of like size and shape mounted on a common axis for rotation with respect to each other, said discs being of a diameter such that their peripheral edges may be readily engaged for adjustment by the fingers of the hands of the operator and being adapted to provide for holding the discs in set position between the fingers of a hand of the operator at any location around the said discs, one of said discs having a scale on its inner surface, the other of said discs having a transparent portion overlying and protecting said scale and having a reference mark thereon, a pair of spaced apart hinged members at the outer surface of said scale carrying disc, one having a bubble level and the other having a mirror, and a pair of spaced apart hinged members at the outer surface of said other disc having component elements for training said reference mark on an object upon rotation of said other disc, said discs being thin and said hinged members being collapsible against the discs, thereby providing a compact, disc-shaped, readily portable, device.

9. In combination in a device of the class described, a pair of registering coincident juxtaposed discs of like size and shape mounted on a common axis for rotation with respect to each other, said discs being of a diameter such that their peripheral edges may be readily engaged for adjustment by the fingers of the hands of the operator and being adapted to provide for holding the discs in set position between the fingers of a hand of the operator at any location around the said discs, one of said discs having a scale on its inner surface, the other of said discs having a transparent portion overlying and protecting said scale and having a reference mark thereon, a pair of spaced apart hinged members at the outer surface of said scale carrying disc, one having a bubble level and the other having a mirror, and a pair of spaced apart hinged members at the outer surface of said other disc having component elements for training said reference mark on an object upon rotation of said other disc, said discs being thin and said hinged members being collapsible against the discs, thereby providing a compact, disc-shaped, readily portable, device, said training hinged members being disposed at opposite sides of said common axis and adjacent the periphery of the outer surface of said other disc, and said bubble level and mirror hinged members being disposed respectively adjacent the periphery of the outer surface of said scale carrying disc and at the center of the outer surface of said scale carrying disc.

10. In combination in a device of the class described, juxtaposed plate-like members mounted on a common axis for rotation with respect to each other and each having an inner surface adjacent to and facing an inner surface of the other, and each having an outwardly facing outer surface, one of said rotatable members carrying an arcuate scale, the other of said rotatable members having a reference mark thereon cooperating with said scale, leveling means mounted on the outwardly facing outer surface of said scale carrying member and adapted to set a given division on said scale in a horizontal plane, and means mounted on the outwardly facing outer surface of said other rotatable member for training said reference mark on an object by rotation of said other rotatable member relative to said scale carrying member, the thickness of said juxtaposed plate-like members being such as to permit of simultaneous observance of the leveling means on one side of the device and the training means on the other side of the device.

11. Apparatus according to claim 10 in which said reference mark is disposed at an extremity of said other rotatable member and said training means thereon comprises spaced apart elements mounted adjacent opposite extremities of said other rotatable member and in alignment with said reference mark.

12. Apparatus according to claim 10 in which said reference mark is disposed at an extremity of said other rotatable member and said training means thereon comprises spaced apart elements mounted adjacent opposite extremities of said other rotatable member and in alignment with said reference mark, said spaced apart elements providing a mounting for visual line of sight means including a projection on one element and a notch on the other and for light ray alignment means including a hole in one element and a target on the other element.

13. Apparatus according to claim 10 in which said scale carrying member comprises a disc and said leveling means is mounted adjacent the periphery of said scale carrying disc.

14. Apparatus according to claim 10 in which said scale carrying member comprises a disc and said leveling means is mounted adjacent the periphery of said scale carrying disc, a mirror mounting pivoted on said common axis and overlying said scale carrying disc and a mirror mounted thereon for adjustment to view the leveling means while sighting with said training means.

15. Apparatus according to claim 10 in which said rotatable members comprise discs of like size and shape, each of said discs being of a diameter such that its opposite peripheral edges may be simultaneously engaged for adjustment by the fingers of one hand of the operator and being adapted to provide for holding the discs in set position between the fingers of a hand of the operator at any location around said discs.

WALLACE J. ECKERT.

REFERENCES CITED

The following references are of record in the file of this patent:

UNITED STATES PATENTS

| Number | Name | Date |
|---|---|---|
| 246,424 | Schmolz | Aug. 30, 1881 |
| 313,494 | Hale | Mar. 10, 1885 |
| 675,189 | Berger | May 28, 1901 |
| 2,253,844 | Cassavant | Aug. 26, 1941 |

FOREIGN PATENTS

| Number | Country | Date |
|---|---|---|
| 232,033 | Great Britain | Apr. 16, 1925 |
| 375,249 | Italy | Sept. 29, 1939 |
| 501,737 | England | Feb. 27, 1939 |
| 761,995 | France | Jan. 18, 1934 |